(12) United States Patent
Dapremont et al.

(10) Patent No.: US 8,357,302 B2
(45) Date of Patent: Jan. 22, 2013

(54) REACTION SYSTEMS WITH INCORPORATED CHROMATOGRAPHY UNITS FOR ENHANCED PRODUCT RECOVERY

(75) Inventors: Olivier Dapremont, Cameron Park, CA (US); Aslam Malik, Cameron Park, CA (US)

(73) Assignee: Ampac Fine Chemicals LLC, Ranch Cordova, CA (US)

( * ) Notice: Subject to any disclaimer, the term of this patent is extended or adjusted under 35 U.S.C. 154(b) by 0 days.

(21) Appl. No.: 13/190,781

(22) Filed: Jul. 26, 2011

(65) Prior Publication Data

US 2012/0024785 A1    Feb. 2, 2012

Related U.S. Application Data

(60) Provisional application No. 61/369,966, filed on Aug. 2, 2010.

(51) Int. Cl.
B01D 15/08    (2006.01)

(52) U.S. Cl. .................................. 210/659; 210/198.2

(58) Field of Classification Search .................. 210/635, 210/656, 659, 198.2
See application file for complete search history.

(56) References Cited

U.S. PATENT DOCUMENTS

| | | | |
|---|---|---|---|
| 5,284,992 A | | 2/1994 | Hotier et al. |
| 5,676,847 A | * | 10/1997 | Yamamoto et al. ........... 210/784 |
| 5,709,797 A | * | 1/1998 | Bocchiola et al. ........... 210/635 |
| 5,817,238 A | * | 10/1998 | Makino et al. ............... 210/659 |
| 5,965,028 A | * | 10/1999 | Verhoff et al. ............... 210/651 |
| RE36,361 E | * | 11/1999 | Kearney et al. .............. 210/656 |
| 6,045,703 A | * | 4/2000 | Miller .......................... 210/659 |
| 6,325,940 B1 | | 12/2001 | Ikeda |
| 6,475,390 B1 | * | 11/2002 | Durham et al. ............... 210/650 |
| 6,663,780 B2 | * | 12/2003 | Heikkila et al. .............. 210/659 |
| 6,709,527 B1 | * | 3/2004 | Fechter et al. ............... 127/46.2 |
| 2002/0153327 A1 | * | 10/2002 | Lee ............................... 210/748 |
| 2003/0222021 A1 | * | 12/2003 | Ennelin et al. ............... 210/635 |
| 2007/0205156 A1 | * | 9/2007 | Lee et al. ..................... 210/656 |
| 2011/0172411 A1 | * | 7/2011 | Heikkila et al. ............. 536/127 |

OTHER PUBLICATIONS

Snyder, Introduction to Modern Liquid Chromatography, John Wiley & Sons, Inc., 1979, pp. 722-731.*

* cited by examiner

*Primary Examiner* — Ernest G Therkorn
(74) *Attorney, Agent, or Firm* — Kilpatrick Townsend & Stockton LLP.

(57) ABSTRACT

Product yields in chemical reactions that produce a solid product from a liquid reaction mixture are improved by chromatographically separating certain key impurities from the product mixture prior to crystallization, or from the filtrate after crystallization in which case further product is crystallized from the filtrate. The removal of key impurities either before the first crystallization or between the first and second crystallizations facilitates the crystallization of product to produce a higher yield of product.

9 Claims, 2 Drawing Sheets

REACTION SYSTEMS WITH INCORPORATED CHROMATOGRAPHY UNITS FOR ENHANCED PRODUCT RECOVERY

CROSS-REFERENCE TO RELATED APPLICATION

This application claims the benefit of U.S. Provisional Patent Application No. 61/369,966, filed Aug. 2, 2010, the contents of which are incorporated herein by reference.

BACKGROUND OF THE INVENTION

1. Field of the Invention

This invention lies in the field of chromatography, and particularly the chromatographic technique known in the art as simulated moving bed chromatography (SMB).

2. Description of the Prior Art

Many solid chemical species that are synthesized in liquid reaction media must be recovered and various impurities must be removed after the reaction has been terminated. The impurities may include degradation products, unreacted starting materials, and the products of competing reactions. Product recovery is performed by crystallization, which serves two purposes: the first is to recover the product as a solid, and often a solid of a particular crystal structure (such as a polymorph), and the second is to purify the product by crystallizing the product preferentially over the impurities. To avoid or minimize the precipitation of impurities, crystallization is commonly performed in such a way that a certain amount of product remains in solution. This uncrystallized product is thus lost to the filtrate which is then discarded as a waste effluent of the process. Complete crystallization of the product can result in precipitation of the impurities with the product, requiring additional purification stages to achieve the desired purity. This downstream purification typically includes filtration, precipitation, centrifugation, or other means of compacting the product into a filter cake, followed by washing the filter cake with a wash liquid, which is typically the solvent used in the reaction medium. In many cases, several washes are required to remove the filtrate and associated impurities from the filter cake. During each wash, a small amount of crystallized product is redissolved and lost in the wash. For all of these reasons, significant losses of product are common, and obtaining a product of high purity often entails a sacrifice in yield. A loss of 10% to 30% of the product to the filtrate or to the combined filtrate and wash liquid is not unusual.

With significant amounts of high-value product in the filtrate, processes for recovery of high-purity product from the filtrate with an impurity profile similar to that of the first intent material are of great interest, particularly in the pharmaceutical industry. In certain cases, the filtrate itself can be subjected to crystallization and a "second crop" can be isolated to increase the overall yield. In most cases, however, this second crystallization fails to meet the purity criteria because the level of impurities is higher in the filtrate than in the initial product mixture, and these impurities either prevent the second crop crystallization from occurring or make the second crop crystallization uneconomical because of the low yield.

SUMMARY OF THE INVENTION

It has now been discovered that crystallization of product either in the first-crop crystallization or the second-crop crystallization can be facilitated, and the yield of recovered crystallized product increased, by removing a substantial portion of troublesome impurities from either the product mixture in the first case or the first filtrate in the second case. In accordance with this invention, therefore, these troublesome impurities are removed at either or both of two stages in the process, i.e., from the product mixture resulting from the reaction before the product is crystallized out, from the filtrate left by the crystallization of the product mixture, or from both. In the first case, a single crystallization will result in a higher yield of isolated solid product, while in the second case, the two crystallizations when combined will result in a higher yield of isolated solid product. In embodiments where impurities are removed after the first crystallization of product from the reaction mixture, the filtrate on which this removal step is performed is either the filtrate obtained directly from the filtration of the product mixture alone or the combination of the filtrate from the product mixture and wash liquid resulting from washing the filter cake following filtration. Alternatively, a solvent exchange can be performed on the filtrate to form a new solution containing the matter that was dissolved in the original filtrate, and the succeeding steps of the invention are then performed on the new solution rather than on the original filtrate. By "troublesome impurities" is meant impurities, or generally species other than the desired reaction product, that impede crystallization of the product from the original filtrate or that tend to co-crystallize with the product in such a manner as to prevent or reduce the selectivity of the crystallization of the product, i.e., the preferential crystallization.

DETAILED DESCRIPTION OF THE INVENTION AND SELECTED EMBODIMENTS

Figure 1:
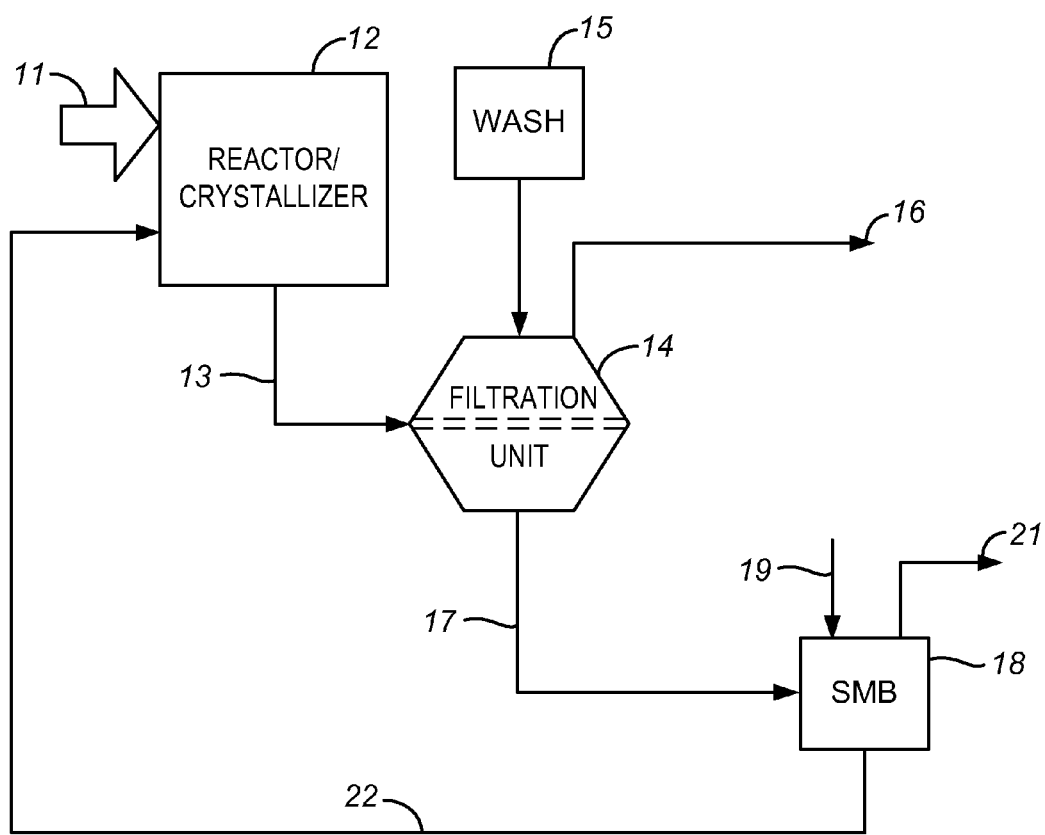
FIG. 1 is a process flow diagram of a reaction and product recovery system in accordance with the present invention.

In accordance with this invention, these troublesome impurities in either the initial product mixture, the filtrate, or the solvent-exchanged filtrate are separated from the product to form a separate liquid solution or stream. The result is one liquid stream that is depleted of the impurities and another liquid stream that is depleted of the product. The term "depleted" is used in this context to mean substantially reduced in concentration. In the stream depleted of impurities, the reduction in concentration of the impurities will be that which is sufficient to cause product to be recovered from that stream by crystallization that could not be recovered by crystallization from the product stream of the reaction. In the stream depleted of product, the reduction in concentration of the product will be the reduction resulting from separating the product out into the stream that is depleted of impurities. Isolation of solid product from the liquid product stream, i.e., the stream that is depleted of impurities, is then achieved by conventional unit operations such as evaporation of the volatile liquid or concentration of the product followed by precipitation or by aggressive crystallization, and then by separation of the filter cake by centrifugation or filtration. "Aggressive crystallization" is known in the art and generally refers to crystallization under conditions that force essentially all product out of the liquid. Aggressive crystallization is similar to conventional crystallization but with control of the crystal structure (polymorph) and size. With the troublesome impurities having been removed, a quantity of solid product is obtained than could not be obtained from direct crystallization of the original product stream. This quantity, whether obtained by a single crystallization or by the combination of first and second crops, amounts to a higher yield of purified product than could otherwise be obtained.

While the original product mixture will typically contain two or more troublesome impurities, the process of the present invention similarly applies to product mixtures that contain a single such impurity. Furthermore, while removal, or reduction of the concentration of, the impurity(ies) will improve the degree to which product is crystallized, such an improvement will in many cases be achieved with a reduction of some but not all of the troublesome impurities. In many cases, the impurities whose removal or reduction will produce the greatest improvement in the crystallizability and purity of the product are readily identified. In certain cases but not all, these impurities are the impurities present in the highest concentration in either the product mixture or the filtrate, depending on which of these is sought to be crystallized. These impurities, and the impurities in general that either impede crystallization or that co-crystallize with the product, are readily determinable by routine experimentation.

Separation of the troublesome impurities and the product into separate liquid solutions can be achieved by chromatography, either batchwise or continuous, including liquid chromatography, gas chromatography, gas-liquid chromatography, and supercritical chromatography. Various forms of chromatography can be used, including those using a fixed-bed solid phase, those using a fluidized-bed solid phase, and those using supercritical fluids. The invention is applicable to batch reaction systems, continuous reaction systems, and reaction systems that are in part batchwise and in part continuous. For continuous and partially continuous reaction systems, a continuous chromatography system can be integrated into a continuous reaction system. Simulated moving bed (SMB) systems are examples of continuous chromatography systems, and SMB systems of particular interest in this invention are those that combine the more strongly retained components of the feed into a single extract (or a combined extract from two or more extracts) and the more weakly retained components into a single raffinate (or a combined raffinate from two or more raffinates). The configuration, materials, and operating conditions of an SMB system can be selected and adjusted to divide the product and the troublesome impurities between the extract and raffinate, the product being recovered in one and the impurities recovered in the other. Depending on the choice of solid phase, eluent, and operating conditions, the product can thus be recovered in the extract and the impurities in the raffinate, or vice versa.

As is known in the art, SMB systems use a packed-bed solid phase and a liquid mobile phase. Use of the solid phase is optimized by a column configuration that places the stationary phase in a loop and effectively moves the stationary phase through the loop while moving the mobile phase through the same loop in the opposite direction. Feed and eluent are introduced at different points in the loop, while extract (the more strongly retained component) and raffinate (the weakly retained component) are withdrawn at still further points in the loop that alternate with the introduction points of feed and eluent. This effectively creates countercurrent flows of stationary and mobile phases.

In an SMB system, stationary ports are distributed around a stationary column loop, with each port capable of both introduction and withdrawal. The column loop is operated in stages, reconnecting the ports between each stage by switching valves to change the functions of the ports as introduction and withdrawal sites. For a selected time interval, therefore, the feed introduction, eluent introduction, extract withdrawal, and raffinate withdrawal ports will be located at distinct sites around the column loop, and for each succeeding time interval, these sites will be advanced by increments around the loop in the direction of flow of the eluent, thereby simulating a moving bed. Each port thus alternates between serving as an inlet and as an outlet, and between the two types of inlet (feed and eluent) as well as the two types of outlet (extract and raffinate).

The column loop typically consists of several columns connected in series, with the introduction/withdrawal ports located between columns. Each pair of adjacent ports along the flow path can be separated by a single column or by two or more columns, When adjacent ports are separated by two or more columns, the number of stepwise advances needed to complete a full circuit of the system can be greater than four, and the system can be operated with zones of different lengths, i.e., different numbers of columns between different pairs of adjacent ports. Differences in zone length among the various zones also allows the system to be operated in an asynchronous manner (commonly known as "Varicol"), i.e., by switching different port functions at different times rather than all at the same time. Similar differences also allow the system to be operated under cyclic feed rate modulation wherein the feed rates are allowed to change during a switching period (commonly known as "PowerFeed"), as well as any other SMB variations known in the art.

Descriptions of SMB chromatography can be found in Miller, L., et al., "Chromatographic resolution of the enantiomers of a pharmaceutical intermediate from the milligram to the kilogram scale," *J. Chromatog. A,* 849(2), 309-317 (1999), Negawa, M., et al., U.S. Pat. No. 5,434,298 (issued Jul. 18, 1995); Nagamatsu, S., et al., U.S. Pat. No. 6,217,774 (issued Apr. 17, 2004); Ikeda, H., U.S. Pat. No. 6,372,127 (issued Apr. 16, 2002); Ikeda, H., et al., U.S. Pat. No. 6,533, 936 (issued Mar. 18, 2003); Ohnishi, A., et al., United States Patent Application Publication No. US 2005/0054878 (published Mar. 10, 2005); Dapremont, O., et al., U.S. Pat. No. 7,618,539 (issued Nov. 17, 2009); Cavoy, E., et al., "Laboratory-developed simulated moving bed for chiral drug separations—Design of the system and separation of Tramadol enantiomers," *J. Chromatog.* A 769, 49-57 (1997); and *Chiral Separation Techniques—A Practical Approach*, 3d ed., Subramanian, G., ed., Wiley-VCH Verlag GmbH & Co. KGaA, Wernheim, Germany (2007).

The following sequence illustrates a procedure in accordance with this invention, whereby troublesome impurities are removed prior to the crystallization of product from the reaction mixture.

(a) Starting materials are reacted in a liquid reaction medium to produce a liquid product mixture.

(b) The product mixture is passed through a chromatography system to produce two streams, with the product recovered in one stream and the troublesome impurities, or at least the key impurities that either impede crystallization or co-crystallize with the product and cannot be separated from the product by crystallization, recovered in the other stream.

(c) Product is crystallized from the stream in which the product predominates.

(d) The crystallized product is recovered as a filter cake, which is washed for further purification. The wash liquid can either be the same solvent in which the starting materials were dissolved or a different wash liquid.

The single batch or crop of crystallized material will then constitute a higher yield of product than that obtained without the intervening chromatography step.

The following sequence illustrates a procedure in accordance with this invention, whereby troublesome impurities are removed after crystallization of a first crop of product from the reaction mixture.

(a) Starting materials are reacted in a liquid reaction medium, and product is crystallized from the resulting product mixture.

(b) The product mixture is filtered to produce a filter cake and a filtrate.

(c) The filtrate is passed through a chromatography system to produce two streams, with the product recovered in one stream and the troublesome impurities, or at least the key impurities that either impede crystallization or co-crystallize with the product and cannot be separated from the product by crystallization, recovered in the other stream.

(d) Product is crystallized from the stream in which it resides, either by using the same crystallization method as in step (a) or by other conventional methods such as precipitation or aggressive crystallization, or by a modification of the original crystallization conditions.

(e) The product thus crystallized is recovered.

As an optional additional isolation step, the filter cake can be washed with a wash liquid, which can be the same solvent in which the starting materials were dissolved, and the liquid emerging from this washing step can be combined with the filtrate prior to step (c). As a further optional step, the filtrate can be evaporated down prior to step (c) and a new solvent introduced by solvent exchange prior to step (c), since certain chromatography systems may benefit from use of a solvent other than that used in the reaction.

The two quantities of crystallized material will then constitute a higher yield of product than that obtained directly from the reaction and work-up of steps (a) and (b) and, when included, the washing step.

The following sequence illustrates a procedure that involves a continuous reaction system and a continuous chromatography system, still in accordance with this invention. Here, as in the illustration above, troublesome impurities are removed after crystallization of a first crop of product from the reaction mixture.

(a) Starting materials are reacted in a liquid reaction medium, and product is crystallized from the resulting product mixture.

(b) The product mixture is filtered to produce a filter cake and a filtrate.

(c) Optionally, the filter cake is washed with a wash liquid, which can be the same solvent in which the starting materials were dissolved, and the liquid emerging from this washing step is combined with the filtrate.

(d) After an optional solvent exchange, the filtrate, together with the wash liquid when the washing step is performed, is passed through a continuous chromatography system, to produce two streams, with the product residing in one stream (the stream depleted in impurities) and the impurities, or at least the key crystallization-impeding impurities as defined above, residing in the other stream (the stream depleted in product).

(e) Product is crystallized from the stream that is depleted in impurities, using the same crystallization conditions or methods used on the product mixture in step (a).

(f) The product thus crystallized is recovered.

Regardless of which of the above procedures is followed, a filtrate will remain which can be further processed to reclaim still further product. This added reclamation can be achieved by a further chromatographic separation to extract further amounts of impurity, followed by crystallization of product from the remaining stream. The choice of whether or not to perform these additional steps will have its basis in economics, notably the market value of the product vs. the cost of the additional steps.

Examples of process flow schemes for continuous systems embodying the process of the present invention are depicted in the attached drawings.

In the flow scheme of FIG. 1, the starting materials 11, typically dissolved in a solvent, are fed to a reactor 12 where both the reaction to form the desired product and crystallization of the product occur. The resulting product mixture 13 contains both solid and liquid, the solid being the crystallized reaction product and any entrained impurities. The product mixture 13 is fed to a filtration unit 14 where a filter cake is separated from the filtrate. A wash liquid 15 removes impurities from the filter cake, and the filter cake is removed as product 16. The filtrate 17 from the filtration unit is then passed through a continuous (SMB) chromatography unit 18 into which an eluent 19 is also introduced. The chromatography unit is operated under conditions that result in an extract 21 containing the impurities that either impeded crystallization of the product or co-crystallize with the product, and a raffinate 22 containing the product. These conditions include the zone lengths, choice of eluent, and choice of stationary phase. The extract 21 and raffinate 22 are withdrawn from the chromatography unit; the extract 21 is discarded and the raffinate 22 is recycled to the reactor/crystallizer 12, or to the crystallizer alone if the crystallizer is a unit separate from the reactor. In this configuration, the quantity of product directly formed by the reaction and the quantity of product concentrated in the raffinate are combined into a single filter cake 16.

Figure 2:
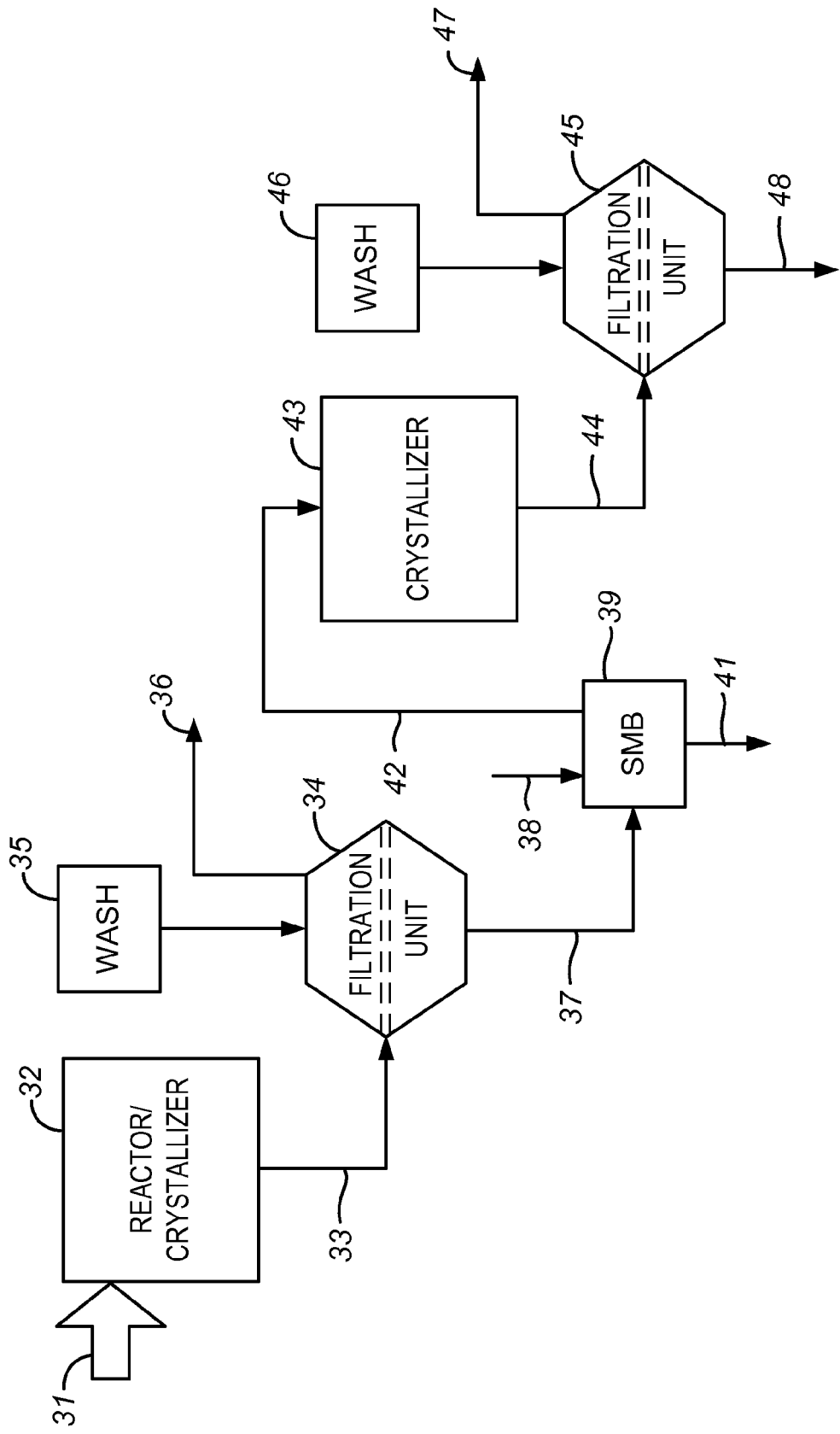
FIG. 2 is a process flow diagram of an alternative reaction and product recovery system in accordance with the present invention.

In the flow scheme of FIG. 2, the starting materials 31 are fed to a reactor/crystallizer 32 as in FIG. 1, and the resulting product mixture 33 is likewise fed to a filtration unit 34 where a wash liquid 35 removes impurities from the filter cake, leaving a first purified quantity of crystallized product 36. Also as in FIG. 1, the filtrate 37 and an eluent 38 are passed through a continuous (SMB) chromatography unit 39 which is operated under conditions that result in an extract 41 containing the impurities and a raffinate 42 containing the product. The scheme differs at this point from that of FIG. 1 by directing the raffinate 42 to a crystallization unit 43 that is separate from the primary reactor/crystallizer 32. The crystallized material from the separate crystallization unit 43 and the remaining liquid 44 are fed to a filtration unit 45 where a filter cake is formed and washed with wash liquid 46. The filter cake 47 containing freshly crystallized and washed product is recovered, supplementing the crystallized and washed product 36 from the first filtration unit 34. The filtrate 48 is discarded together with the extract 41 from the SMB unit or, if it contains a substantial amount of product, it can be recycled, such as for example by combining it with the filtrate 37 from the original crystallization or by evaporating the solvent from the filtrate 48 and mixing the resulting residue with the filtrate 37. Using reaction schemes such as those shown in FIGS. 1 and 2, product recovery in many reactions can be increased from a range of 80-90% to a range of 95-98%.

Alternatives to the flow schemes shown in the figures that are still within the concept of the present invention include variations in the number and arrangement of the units, the inclusion of further recycling, and further processing of the impurity stream to further increase the yield of the system or to convert the impurities to other useful products. Alternatives to other features and aspects of the flow schemes will be readily apparent to those of skill in the art.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is not excluded from the scope of the claim. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for producing a solid organic chemical reaction product from starting materials that react to produce a product mixture comprising said reaction product and impurities, said process comprising:
    (a) reacting said starting materials in a liquid reaction medium to produce said product mixture and crystallizing reaction product from said product mixture;
    (b) filtering said product mixture to produce (i) a filter cake containing said crystallized reaction product and (ii) a filtrate containing dissolved solutes including dissolved reaction product and dissolved impurities;
    (c) passing said dissolved solutes through a simulated moving bed chromatography system to produce a first liquid stream depleted in said dissolved reaction product and a second liquid stream depleted in said dissolved impurities;
    (d) continuously recycling said second liquid stream to said liquid reaction medium of step (a); and
    (e) recovering said crystallized reaction product.

2. The process of claim 1 further comprising washing said filter cake to extract impurities from said filter cake into a wash liquid, and wherein step (c) comprises passing both said filtrate and said wash liquid through said simulated moving bed chromatography system with said eluent.

3. The process of claim 1 further comprising performing a solvent exchange on said filtrate prior to step (c) to form a solvent-exchanged solution of said dissolved solutes, and step (c) comprises passing said solvent-exchanged solution through said simulated moving bed chromatography system.

4. The process of claim 1 wherein steps (b) and (c) are performed continuously.

5. A process for producing a solid organic chemical reaction product from starting materials, said process comprising:
    (a) reacting said starting materials in a liquid reaction medium to produce a first product mixture comprising said reaction product and impurities, and crystallizing a first quantity of said reaction product from said first product mixture;
    (b) filtering said product mixture to produce (i) a first filter cake containing said first quantity of crystallized reaction product and (ii) a first filtrate containing dissolved solutes including dissolved reaction product and dissolved impurities;
    (c) passing said dissolved solutes of said first filtrate and an eluent through a simulated moving bed chromatography system to produce a first liquid stream depleted in said reaction product and a second liquid stream depleted in said impurities;
    (d) crystallizing a second quantity of said reaction product from said second liquid stream to produce a second product mixture;
    (e) filtering said second product mixture to produce (i) a second filter cake containing said second crystallized quantity of said reaction product and (ii) a second filtrate containing dissolved solutes including dissolved reaction proeuct and dissolved impurities;
    (f) continuously recycling said second filtrate to said chromatography system, of step (c); and
    (g) recovering said first and second crystallized quantities of reaction product.

6. The process of claim 5 wherein steps (b), (c), (d), and (e) are performed continuously.

7. The process of claim 5 wherein steps (a), (b), (c), (d), and (e) are performed continuously.

8. The process of claim 5 further comprising washing said first filter cake to extract impurities from said first filter cake into a wash liquid, and wherein step (c) comprises passing both said first filtrate and said wash liquid through said simulated moving bed chromatography system with said eluent.

9. The process of claim 5 further comprising performing a solvent exchange on said filtrate prior to step (c) to form a solvent-exchanged solution of said dissolved solutes, and step (c) comprises passing said solvent-exchanged solution through said simulated moving bed chromatography system.

* * * * *